United States Patent
Roy Thill et al.

(10) Patent No.: US 11,143,050 B2
(45) Date of Patent: Oct. 12, 2021

(54) SEAL ASSEMBLY WITH REDUCED PRESSURE LOAD ARRANGEMENT

(71) Applicant: Raytheon Technologies Corporation, Farmington, CT (US)

(72) Inventors: Carson A. Roy Thill, South Berwick, ME (US); Jaime A. Arbona, West Palm Beach, FL (US); Justin K. Bleil, Sanford, ME (US); Andrew D. Keene, Portland, ME (US); Danielle Mahoney, Dover, NH (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 16/903,509

(22) Filed: Jun. 17, 2020

(65) Prior Publication Data
US 2021/0254488 A1   Aug. 19, 2021

Related U.S. Application Data

(60) Provisional application No. 62/975,895, filed on Feb. 13, 2020.

(51) Int. Cl.
*F01D 11/08* (2006.01)
*F01D 25/00* (2006.01)

(52) U.S. Cl.
CPC .......... *F01D 11/08* (2013.01); *F05D 2240/11* (2013.01); *F05D 2300/6033* (2013.01)

(58) Field of Classification Search
CPC .... F01D 11/08; F01D 25/005; F05D 2240/11; F05D 2240/55; F05D 2300/6033
See application file for complete search history.

(56) References Cited

U.S. PATENT DOCUMENTS

| 5,330,321 A | * | 7/1994 | Roberts | F01D 11/18 415/136 |
| 6,884,026 B2 | * | 4/2005 | Glynn | F01D 11/08 415/113 |

(Continued)

FOREIGN PATENT DOCUMENTS

EP   3176381   6/2017

*Primary Examiner* — Igor Kershteyn
(74) *Attorney, Agent, or Firm* — Carlson, Gaskey & Olds, P.C.

(57) ABSTRACT

A seal assembly for a gas turbine engine according to an example of the present disclosure includes, among other things, a seal arc segment including a sealing portion, and a first rail and a second rail opposed to the first rail. The sealing portion extends in a circumferential direction between opposed mate faces and extends in an axial direction between a leading edge and a trailing edge. Each of the first and second rails extend outwardly in a radial direction from the sealing portion to respective first and second edge faces, and the sealing portion has a sealing face dimensioned to bound a gas path and includes a backside face opposed to the sealing face. Each of the first and second rails includes at least one interface bore dimensioned to receive a retention pin such that the seal arc segment is carried by the retention pin in an installed position. The seal arc segment is radially opposed to the sealing face between the first and second edge faces establishing a first region. The seal arc segment is radially opposed to the sealing face between the leading and trailing edges establishing a second region. A method of sealing for a gas turbine engine is also disclosed.

20 Claims, 12 Drawing Sheets

(56) References Cited

U.S. PATENT DOCUMENTS

| | | |
|---|---|---|
| 7,726,936 B2 | 6/2010 | Keller et al. |
| 7,874,795 B2 | 1/2011 | Burdgick et al. |
| 8,328,505 B2 | 12/2012 | Shi et al. |
| 8,579,580 B2 | 11/2013 | Albers et al. |
| 8,753,073 B2 | 6/2014 | Albers et al. |
| 9,127,569 B2 | 9/2015 | Akiyama et al. |
| 9,518,474 B2 | 12/2016 | Shapiro et al. |
| 9,863,265 B2 | 1/2018 | Stapleton |
| 9,874,104 B2 | 1/2018 | Shapiro |
| 9,963,990 B2 | 5/2018 | Vetters et al. |
| 10,370,998 B2 | 8/2019 | Vetters et al. |
| 10,385,718 B2 | 8/2019 | O'Leary et al. |
| 10,590,803 B2 * | 3/2020 | Quennehen ............ F01D 25/246 |
| 10,619,514 B2 * | 4/2020 | Walston ................. F01D 25/246 |
| 10,815,810 B2 * | 10/2020 | Barker ................... F01D 11/005 |
| 10,858,949 B2 * | 12/2020 | Walston ................. F01D 25/005 |
| 2014/0271147 A1 * | 9/2014 | Uskert .................... F01D 11/22 |
| | | 415/173.2 |
| 2017/0016341 A1 | 1/2017 | Stapleton et al. |
| 2021/0131299 A1 * | 5/2021 | Lutjen ..................... F01D 9/04 |
| 2021/0131300 A1 * | 5/2021 | Arbona ................. F01D 11/005 |
| 2021/0156311 A1 * | 5/2021 | Lutjen .................... F01D 21/08 |

\* cited by examiner

SEAL ASSEMBLY WITH REDUCED PRESSURE LOAD ARRANGEMENT

CROSS-REFERENCE TO RELATED APPLICATIONS

This application claims priority to U.S. Provisional Application 62/975,895, filed Feb. 13, 2020.

BACKGROUND

This disclosure relates to cooling of gas turbine engine components.

Gas turbine engines can include a fan for propulsion air and to cool components. The fan also delivers air into a core engine where it is compressed. The compressed air is then delivered into a combustion section, where it is mixed with fuel and ignited. The combustion gas expands downstream over and drives turbine blades. Static vanes are positioned adjacent to the turbine blades to control the flow of the products of combustion.

The turbine section may include multiple stages of rotatable blades and static vanes. An annular shroud or blade outer air seal may be provided around the blades in close radial proximity to the tips of the blades to reduce the amount of gas flow that escapes around the blades. The shroud typically includes a plurality of arc segments that are circumferentially arranged about the blades and mounted to support structure.

Pressurized cooling air may be utilized to cool the shroud.

SUMMARY

A seal assembly for a gas turbine engine according to an example of the present disclosure includes a seal arc segment including a sealing portion, and a first rail and a second rail opposed to the first rail. The sealing portion extends in a circumferential direction between opposed mate faces and extends in an axial direction between a leading edge and a trailing edge. Each of the first and second rails extend outwardly in a radial direction from the sealing portion to respective first and second edge faces, and the sealing portion has a sealing face dimensioned to bound a gas path and includes a backside face opposed to the sealing face. Each of the first and second rails includes at least one interface bore dimensioned to receive a retention pin such that the seal arc segment is carried by the retention pin in an installed position. The seal arc segment is radially opposed to the sealing face between the first and second edge faces establishing a first region. The first region is inclusive of a portion of the backside face and the first and second edge faces. The seal arc segment is radially opposed to the sealing face between the leading and trailing edges establishing a second region. The first and second regions extend circumferentially between the mate faces. The second region is inclusive of the backside face and the first region. A radially facing component of a total surface area of the first region is divided by a radially facing component of a total surface area of the second region establishes a load ratio. The load ratio is equal to or less than 0.5.

In a further embodiment of any of the foregoing embodiments, the seal arc segment comprises a ceramic material.

In a further embodiment of any of the foregoing embodiments, the seal arc segment includes a plurality of ply layers in stacked relationship that establish a backside cavity between the first and second rails along the second region.

In a further embodiment of any of the foregoing embodiments, the plurality of ply layers are radiused at interfaces between the sealing portion and the respective first and second rails.

In a further embodiment of any of the foregoing embodiments, a backside cavity is established between the first and second rails. A radially facing component of a total surface area of the backside cavity is divided by the radially facing component of the total surface area of the second region is equal to or less than 0.2.

In a further embodiment of any of the foregoing embodiments, a radially facing component of a total surface area of the first and second edge faces is divided by the radially facing component of the total surface area of the first region is equal to or less than 0.5.

In a further embodiment of any of the foregoing embodiments, the load ratio is equal to or greater than 0.2, and is equal to or less than 0.4.

A further embodiment of any of the foregoing embodiments includes a support that has a mounting portion and an interface portion. The mounting portion is attachable to an engine static structure, and the retention pin is dimensioned to engage the interface portion of the support to mount the seal arc segment. A support plate is releasably secured to the support such that the retention pin is trapped between the support and the support plate in an installed position.

In a further embodiment of any of the foregoing embodiments, the seal arc segment includes a ceramic matrix composite material. The sealing portion includes a first cantilevered section between the first rail and the leading edge, and includes a second cantilevered section between the second rail and the trailing edge. The second region is established along the first and second cantilevered sections. A cooling cavity is established such that a perimeter of the cooling cavity is bounded by the support, the support plate, and the backside face between the first and second rails.

In a further embodiment of any of the foregoing embodiments, the cooling cavity is coupled to a fluid source that conveys pressurized cooling flow to the cooling cavity in operation such that a fluid pressure in the cooling cavity along the first region is greater than a fluid pressure across the first cantilevered section and is greater than a fluid pressure across the second cantilevered section.

In a further embodiment of any of the foregoing embodiments, surfaces of the first and second rails slope towards the backside face.

In a further embodiment of any of the foregoing embodiments, the backside face includes a plurality of undulations between the first and second rails.

A gas turbine engine according to an example of the present disclosure includes an engine case extending along an engine longitudinal axis, an array of blades rotatable about the engine longitudinal axis; and a seal assembly including an array of blade outer air seals (BOAS) arranged about the array of blades. Each of the BOAS includes a sealing portion, a first rail and a second rail opposed to the first rail, the first and second rails extending outwardly from the sealing portion, and the sealing portion includes a sealing face dimensioned to bound a core flow path and including a backside face opposed to the sealing face. At least one support is attached to the engine case. A plurality of retention pins is dimensioned to engage the at least one support and the first and second rails of a respective one of the BOAS such that the BOAS are carried by the retention pins. A cooling cavity is established in a radial direction between at least one support and the backside face and in an axial direction between the first and second rails relative to the engine longitudinal axis, and a radially facing component of a total surface area of the respective BOAS along the cooling cavity divided by a radially facing component of a total surface area of the blade outer air seal opposite the sealing face establishes a load ratio. The load ratio is equal to or less than 0.5.

In a further embodiment of any of the foregoing embodiments, each of the BOAS comprises a ceramic material.

A further embodiment of any of the foregoing embodiments includes a support plate positioned relative to the at least one support such that the support plate limits movement of the plurality of retention pins relative to the engine longitudinal axis.

In a further embodiment of any of the foregoing embodiments, each of the first and second rails extends outwardly in a radial direction from the sealing portion to respective first and second edge faces. A backside cavity is established between the first and second rails. A radially facing component of a total surface area of the first and second edge faces is divided by a radially facing component of a total surface area of the backside cavity is equal to or less than 1.0. The load ratio is equal to or greater than 0.2, and is equal to or less than 0.4.

A method of sealing for a gas turbine engine according to an example of the present disclosure includes positioning a seal arc segment relative to a support. The support is attachable to an engine static structure. The seal arc segment includes opposed first and second rails extending radially outwardly from a sealing portion. The sealing portion includes a sealing face dimensioned to bound a gas path and includes a backside face radially opposed to the sealing face. The method includes moving at least one retention pin into engagement with the support and with at least one of the first and second rails such that the seal arc segment is carried by the at least one retention pin, and conveying pressurized cooling flow to a cooling cavity. The support and the backside face of the seal arc segment are bound a perimeter of the cooling cavity. A radially facing component of a total surface area of the seal arc segment along the cooling cavity is divided by a radially facing component of a total surface area of the seal arc segment opposite the sealing face establishes a load ratio. The load ratio is equal to or less than 0.5.

In a further embodiment of any of the foregoing embodiments, the seal arc segment comprises a ceramic material.

A further embodiment of any of the foregoing embodiments includes trapping the at least one retention pin between the support and a support plate. The support plate is dimensioned to bound the perimeter of the cooling cavity.

In a further embodiment of any of the foregoing embodiments, the backside face includes a first localized region between the first rail and a leading edge of the sealing portion, a second localized region between the first and second rails bounding the cooling cavity, and a third localized region between the second rail and a trailing edge of the sealing portion. The first and third localized regions are outward of the perimeter of the cooling cavity such the first and third localized regions are exposed to the gas path. The conveying step occurs such that a fluid pressure across the second localized region is greater than a fluid pressure across the first localized region and is greater than a fluid pressure across the third localized region.

The various features and advantages of this disclosure will become apparent to those skilled in the art from the following detailed description. The drawings that accompany the detailed description can be briefly described as follows.

DETAILED DESCRIPTION

Figure 1:
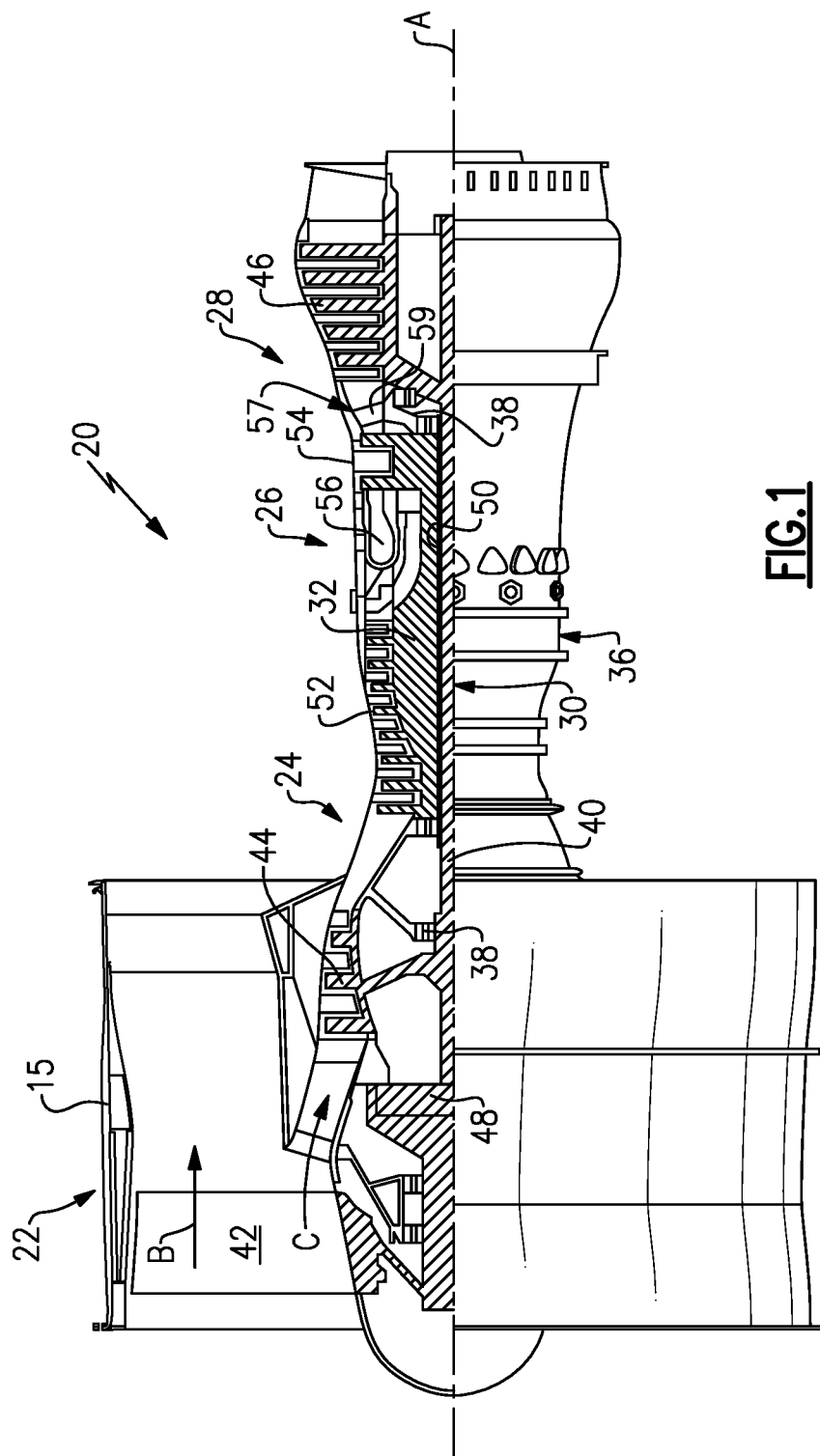
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 meters/second).

Figure 2:
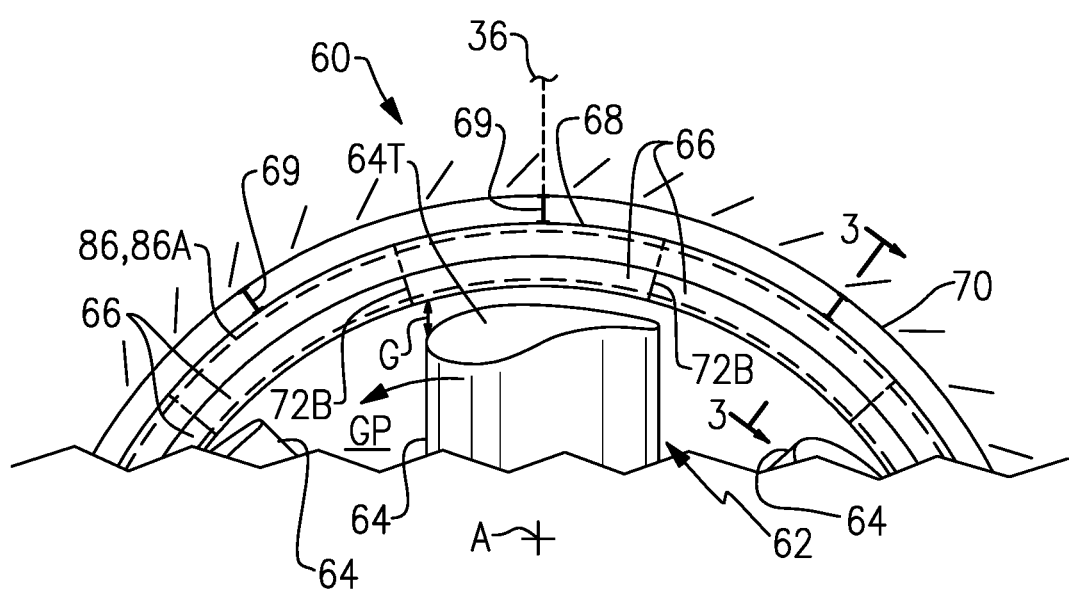
FIG. 2 illustrates an axial view of an example blade outer air seal assembly including a plurality of seal arc segments.

FIG. 2 illustrates an axial view of an example assembly 60 for a gas turbine engine. The assembly 60 can be incorporated into a portion of the engine 20 of FIG. 1, such as the turbine section 28. In the illustrative example of FIG. 2, the assembly 60 is a blade outer air seal assembly for sealing portions of a gas turbine engine. The assembly 60 can alternatively or additionally be adapted for other portions of the engine 20, such as an upstream stage of the compressor section 24 or combustor panels defining portions of a combustion chamber located in the combustor section 26. Although the teachings herein primarily refer to a two-spool gas turbine engine having a fan, other systems can benefit from the teachings herein, such as engines without a fan and other ground based systems.

The assembly 60 is positioned radially outward of a rotor 62 having an array (or row) of airfoils or rotatable blades 64. The blades 64 are rotatable about the engine longitudinal axis A in a gas path GP, such as the core flow path C (FIG. 1). The blades 64 are positioned adjacent to one or more rows of vanes that direct flow in the gas path GP towards the blades 64.

The assembly 60 includes one or more gas turbine engine components 66. In the illustrative example of FIG. 2, the components 66 are blade outer air seals (BOAS) or seal arc segments. The assembly 60 includes an array of seal arc segments 66 circumferentially arranged in an annulus around the engine longitudinal axis A and about the blades 64. The seal arc segments 66 are mounted to at least one support 68, which can be continuous or can be segmented as a plurality of supports (illustrated by dashed lines in FIG. 2). The support 68 is mounted or attached to an engine case 70 through one or more connections 69. The engine case 70 provides a portion of the engine static structure 36 (FIG. 1). The engine case 70 is arranged about and extends along the engine axis A. In other examples, the seal arc segments 66 are directly attached to the engine case 70. The engine case 70 can be mounted or attached to, or form a portion of, the engine static structure 36 (see also FIG. 1).

Each seal arc segment 66 can be formed of a material having a high temperature capability. Example high temperature materials include metallic alloys and ceramic-based materials, such as a monolithic ceramic or a ceramic matrix composite (CMC) material. An example of a high temperature metallic alloy is a nickel-based alloy. Monolithic ceramics include, but are not limited to, silicon carbide (SiC) or silicon nitride ($Si_3N_4$). In other examples, each seal arc segment 66 is formed of high-toughness material such as, but not limited to, single crystal metallic alloys.

The seal arc segments 66 are positioned in close radial proximity to tips 64T of the blades 64 to reduce the amount of gas flow that escapes around the blades 64 and through a clearance gap G. The engine 20 can include an active or passive clearance control system to adjust the clearance gap G to a desired dimension during one or more operating conditions of the engine 20. The clearance gap G may also vary during operation of the engine 20, such as between a non-operating, cold state condition, and an operating condition such as a cruise and/or takeoff condition of the engine 20.

Figure 3:
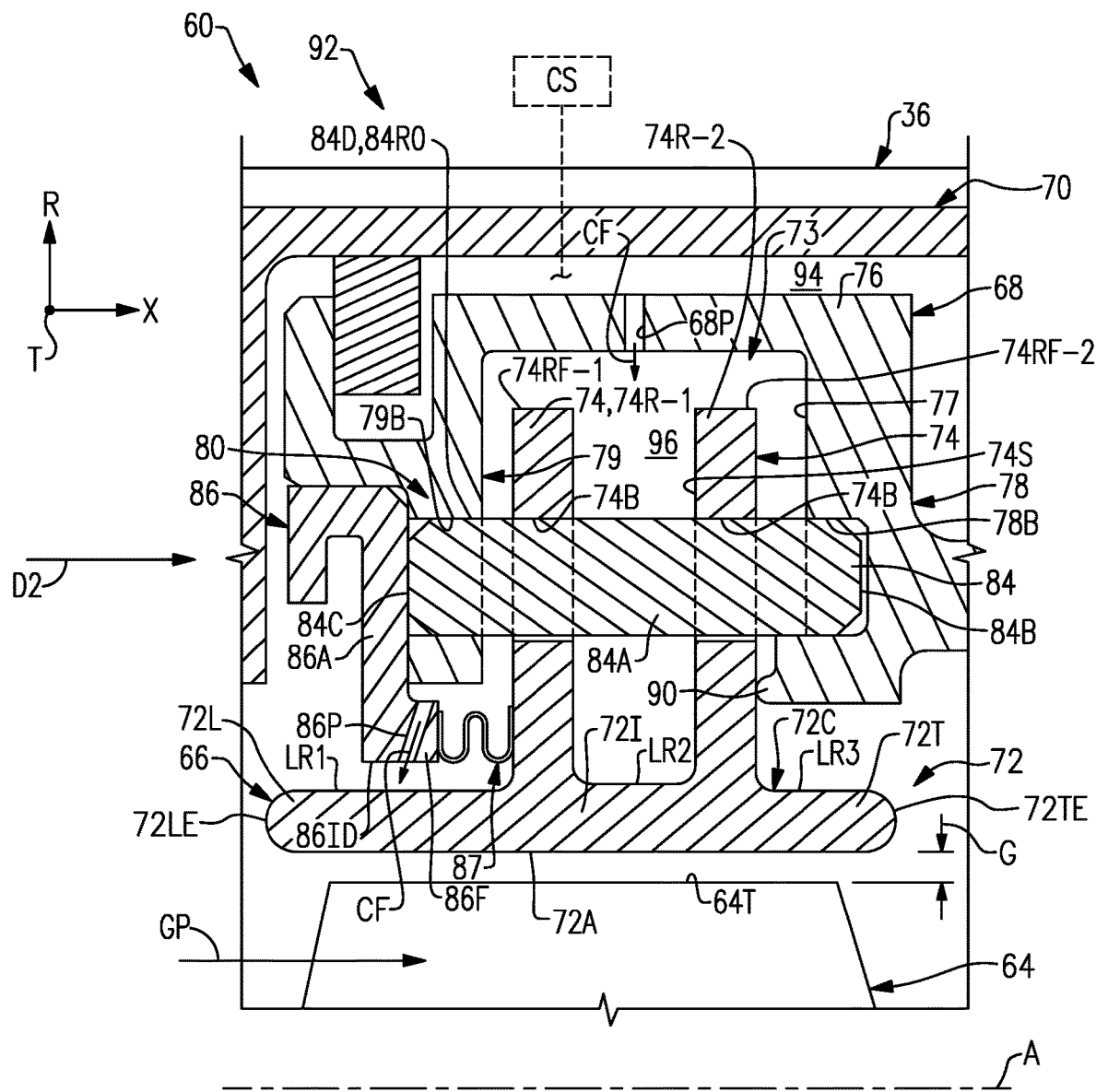
FIG. 3 illustrates a section view of the seal assembly taken along line 3-3 of FIG. 2 including a cooling scheme.
Figure 4:
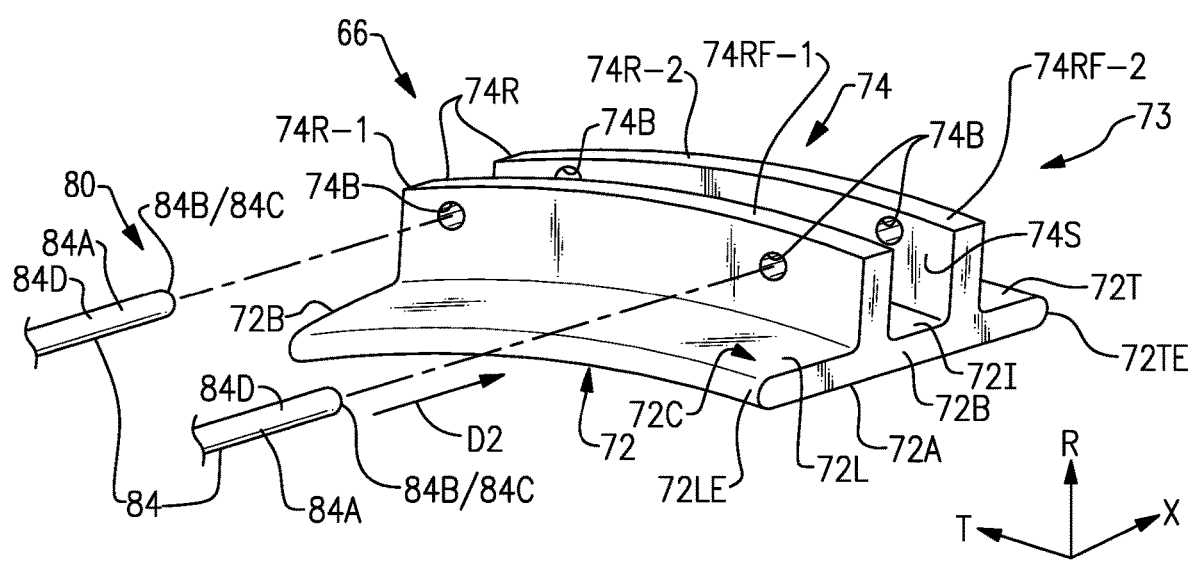
FIG. 4 illustrates a perspective view of the seal arc segment of FIG. 3.

Referring to FIG. 3, with continuing reference to FIG. 2, an axial cross section view of the assembly 60 is shown. FIG. 4 illustrates a perspective view of an example seal arc segment 66. The seal arc segment 66 is arranged about the longitudinal axis A to bound the gas path GP. Each seal arc segment 66 includes a sealing portion 72 and a seal interface portion 74 along a backside 73 of the seal arc segment 66. The sealing portion 72 includes a generally arcuate sealing face (or surface) 72A extending in a circumferential (or thickness) direction T between circumferential mate faces 72B and extending in an axial direction X between a leading edge 72LE and a trailing edge 72TE, as illustrated by FIG. 4 (see also FIG. 2). The axial direction X can be parallel or substantially parallel to the longitudinal axis A. The sealing face 72A is dimensioned to bound portions of the gas path GP, such as the core flow path C of FIG. 1. The backside face 73 is radially opposed to the sealing face 72A. The sealing face 72A can face radially inward and the backside face 73 faces radially outward relative to the longitudinal axis A when the seal arc segment 66 is in an installed position, as illustrated by FIG. 3.

The first interface portion 74 of the seal arc segment 66 includes a pair of opposed first and second rails 74R (indicated at 74R-1, 74R-2) extending radially outwardly in a radial direction R from the sealing portion 72 to respective first and second edge faces 74RF (indicated at 74RF-1, 74RF-2). An elongated slot or backside cavity 74S is established between the rails 74R. The seal arc segment 66, including at least the sealing portion 72 and/or rails 74R of the seal interface portion 74, can be made of any of the materials disclosed herein, including a ceramic-based material such as a CMC material.

The sealing portion 72 of the seal arc segment 66 includes a backside face (or surface) 72C radially opposed to the sealing face 72A. The backside face 72C extends along the backside 73 of the seal arc segment 66. The sealing portion 72 includes a leading edge (or first cantilevered) extension or section 72L, a trailing edge (or second cantilevered) extension or section 72T, and an intermediate (or third) section 72I interconnecting the leading edge and trailing edge sections 72L, 72T. The leading edge section 72L extends in the axial direction X between the first rail 74R-1 and the leading edge 72LE, and the trailing edge section 72TE extends in the axial direction X between the second rail 74R-2 and the trailing edge 72TE. The intermediate section 72I extends in the axial direction X between the leading and trailing edge sections 72L, 72T and between the rails 74R relative to the longitudinal axis A. In the illustrative example of FIGS. 3-4, the leading edge and trailing edge sections 72L, 72T are cantilevered from the intermediate section 72I.

The backside face 72C includes a first (or leading edge) localized region LR1 along the leading edge section 72L between the leading edge 72LE and the first rail 74R-1, a second (or intermediate) localized region LR2 between the pair of rails 74R, and a third (or trailing edge) localized region LR3 along the trailing edge section 72T between the second rail 74R-2 and the trailing edge 72TE. The first and second rails 74R-1, 74R-2 are dimensioned to extend in the circumferential direction T between the opposed mate faces 72B of the seal arc segment 66 to divide the backside face 72C into the first localized region LR1, the second localized region LR2, and the third localized region LR3.

The support 68 includes a mounting portion 76, a first interface portion 78 and a second interface portion 79, which can be made of a metallic material. The mounting portion 76 is attachable to the engine static structure 36 directly or through the engine case 70. In the illustrative example of FIG. 3, the interface portions 78, 79 are flanges that extending radially inwardly from the mounting portion 76 in a direction towards the longitudinal axis A. The support 68 includes a support cavity 77 established between the interface portions 78, 79. The support cavity 77 is dimensioned to at least partially receive the rails 74R.

The assembly 60 includes a retention feature 80 that mounts the seal arc segments 66 to the support 68 during engine operation. The retention feature 80 is dimensioned to carry the seal arc segment 66 in an installed position. The retention feature 80 is dimensioned to establish and maintain a predetermined distance between the sealing face 72A of the seal arc segments 66 and the blade tips 64T across the clearance gap G.

Various retention features 80 can be utilized. The retention feature 80 can be arranged to releasably secure the seal interface portion 74 to the support 68. Example retention features include flanges, fasteners such as clips, pins, bolts and rivets, as well as other components that mechanically join objects together such as a length of wire. In the illustrative example of FIGS. 3-4, the retention feature 80 includes one or more retention pins (or members) 84 releasably secured to the seal arc segment(s) 66. Each retention pin 84 is dimensioned to engage the first and/or second interface portions 78, 79 of the support 68 and the rail(s) 74R of the seal interface portion 74 of a respective one of the seal arc segments 66 such that each of the seal arc segments 66 is carried by one or more of the retention pins 84 to mount the seal arc segments 66 in the installed position. The seal arc segment 66, support 68 and retention pins 84 are separate and distinct components. In the illustrative example of FIG. 4, two retention pins 84 are utilized to mount each seal arc segment 66.

Each retention pin 84 includes an elongated main body 84A extending between opposed first and second end portions 84B, 84C. The retention pin 84 can be dimensioned to span between the first and second interface portions 78, 79, as illustrated in FIG. 3. The main body 84A of the retention pin 84 can have various geometries, such as a circular or otherwise elliptical cross sectional geometry as illustrated by FIGS. 3-4. Other example geometries of the retention pin 84 can include triangular, rectangular and complex cross sectional geometries.

The seal interface portion 74 includes one or more interface bores 74B extending through a respective rail 74R. Each interface bore 74B of the rail 74R-1 is partially or completely radially aligned in the radial direction R with a respective interface bore 74B of the rail 74R-2, as illustrated by FIG. 3. The rails 74R establish respective attachment points along the interface bores 74B dimensioned to engage a respective retention pin 84 for mounting the seal arc segment 66 to the support 68. Each interface bore 74B can have a diameter that is greater than or equal to a diameter of a respective one of the retention pins 84. The interface bores 74B can be dimensioned to have a relatively greater diameter to accommodate differences in thermal expansion of the rails 74R, retention pins 84 and/or support 68 during engine operation. Utilizing the retention pins 84 to mounting the seal arc segments 66 may more evenly distribute loads and reduce localized stress concentrations in the rails 74R adjacent the attachment points.

The first and second interface portions 78, 79 includes one or more respective support bores 78B, 79B (one of each shown in FIG. 3 for illustrative purposes). Each pair of interface bores 74B and pair of support bores 78B, 79B is dimensioned to at least partially receive a common retention pin 84 to establish the installed position of the seal arc segment 66.

In the installed position, each interface bore 74B is partially or completely radially aligned in the radial direction R with an adjacent support bore 78B. Each retention pin 84 is slidably received in, and extends at least partially through, the support bore 79B and the interface bore 74B of each rail 74R-1, 74R-2 and is received in a respective support bore 78B to secure the interface portion 74 to the support 68 in the installed position. Each interface bore 74B is dimensioned to receive a respective retention pin 84 such that the rails 74R of the seal arc segment 66 are carried by an outer periphery 84D of the retention pin(s) 84 in the installed position. The interface bores 74B of each rail 74R are dimensioned to receive a respective retention pin 84 such that the rails 74R of the seal arc segment 66 sit on an outer periphery or radially outer surface 84RO of the retention pin 84, as illustrated by FIG. 3.

The assembly 60 includes a support plate 86 releasably attached or secured to the support 68. Various techniques can be utilized to secure the support plate 86 to the support 68, such as one or more fasteners. The support plate 86 includes a plate body 86A having a generally arcuate geometry and extends about the engine longitudinal axis A. The support plate 86 can be a single component or can include one or more segments mechanically attached to each other. The support plate 86 includes a plate flange 86F extending outwardly from the plate body 86A. The plate flange 86F is dimensioned to extend along an inner diameter 86ID of the support plate 86. The support 68, support plate 86 and retention pins 84 can be made of a high temperature metal or metal alloy, for example.

The support plate 86 can be arranged or positioned relative to the support 68 such that the retention pin(s) 84 are trapped between the support plate 86 and support 68 in the installed position, as illustrated in FIG. 3. The first end portion 84B of the retention pin 84 is at least partially inserted into the respective support bore 78B, and the second end portion 84C of the retention pin 84 is dimensioned to abut against the plate body 86A of the support plate 86 such that the support plate 86 limits axial movement of the retention pin(s) 84 relative to the longitudinal axis A. Various techniques can be utilized to secure the retention pin 84 to the support 68, such as press fitting or threadedly attaching the retention pin 84 in the support bore 78B. The second interface portion 79 of the support 68 is axially opposed to the first interface portion 78 relative to the longitudinal axis A such that the second interface portion 79 is situated between the support plate 86 and the first interface portion 78.

The seal arc segments 66 can be subject to hot gases communicated in the adjacent gas path GP during engine operation. The assembly 60 establishes a cooling arrangement or scheme 92 operable to cool the seal arc segment(s) 66 and adjacent portions of the assembly 60 during engine operation. Various cooling schemes 92 may be utilized, including any of the cooling schemes in combination with any of the assemblies disclosed herein.

The cooling scheme 92 includes at least one feeding plenum (or cavity) 94 and cooling cavity 96. The feeding plenum 94 can be defined by an engine static structure such as the engine case 70 or another portion of the engine static structure 36. The plenum 94 and cooling cavity 96 generally extend in the circumferential direction T about the longitudinal axis A. In the illustrative example of FIG. 3, the plenum 94 is established between the engine case 70 and support 68. The plenum 94 is fluidly coupled to one or more coolant (or fluid) sources CS (one shown in dashed lines for illustrative purposes). The coolant source CS is configured to supply cooling air or fluid flow CF to the plenum 94. The plenum 94 is configured to receive the pressurized cooling flow CF from the cooling source(s) CS to cool portions of the assembly 60 including the seal arc segment(s) 66, support 68 and/or engine case 70 during engine operation. Coolant sources CS can include bleed air from an upstream stage of the compressor section 24 (FIG. 1), bypass air, or a secondary cooling system aboard the aircraft, for example.

The cooling cavity 96 is established along surfaces of the seal arc segment(s) 66. In the illustrative example of FIG. 3, the cooling cavity 96 is established in the radial direction R between the support 68 and the backside face 72C such that the second localized region LR2 bounds the cooling cavity 96. The cooling cavity 96 is established in the axial direction X between the first and second rails 74R-1, 74R-2 relative to the engine longitudinal axis A. The cooling cavity 96 is established such a perimeter of the cooling cavity 96 is bounded by the support 68, support plate 86, and the second localized region LR2 of the backside face 72C between the rails 74R and along the intermediate section 72I of the seal arc segment 66.

The assembly 60 can include a seal member 87 captured between the first rail 74R-1 of the seal arc segment 66 and the plate flange 86F of the support plate 86 to bound the perimeter of the cooling cavity 96 adjacent to the first localized region LR1 along the leading edge section 72L. The seal member 87 is arranged to fluidly isolate the leading edge section 72L from the cooling cavity 96. The seal member 87 can incorporate various seal configurations. In the illustrative example of FIG. 3, the seal member 87 is a W-seal arranged to oppose flow along an axial gap between the seal arc segment 66 and support plate 86.

The first interface portion 78 of the support 68 can be dimensioned to abut the second rail 74R-2 to bound the perimeter of the cooling cavity 96. In the illustrative example of FIG. 3, the support 68 includes at least one face seal 90 dimensioned to engage the interface portion 74 directly or along the second rail 74R-2. The face seal 90 is dimensioned to oppose fluid flow along an axial gap between the seal interface portion 74 and first interface portion 78 of the support 68. The face seal 90 is dimensioned to bound the perimeter of the cooling cavity 96 adjacent to the third localized region LR3.

The cooling scheme 92 can include at least one feeding passage 68P and at least one cooling passage 86P arranged to convey pressurized cooling flow CF between the coolant source CS and portions of the seal arc segment(s) 66. Each feeding passage 68P interconnects the cooling cavity 96 and the coolant source CS to convey pressurized cooling flow CF to the cooling cavity 96 in operation. Each feeding passage 68P is arranged to convey a portion of the cooling flow CF to the backside cavity 74S to cool adjacent portions of the seal arc segment 66.

One or more cooling passages 86P can be arranged at different positions than the feeding passages 68P to convey localized cooling flow CF to surfaces of the seal arc segment(s) 66. In the illustrative example of FIG. 3, the support plate 86 defines one or more cooling passages 86P fluidly coupled to the cooling cavity 96. Each cooling passage 86P is oriented to convey cooling flow CF from the cooling cavity 96 in a direction towards the leading edge section 72L, for example.

CMC-based seal arc segments 66 may have relative lower stress margins and may have a much lower ductility than typical metal. Pressurized cooling flow CF communicated to the cooling cavity 96 may be utilized to cool portions of the seal arc segments 66 and may be delivered to intersegment gaps between mate faces 72C of adjacent seal arc segments 66 to reduce a likelihood of ingestion of hot gases in the gas path GP. The pressurized cooling flow CF may subject the seal arc segments 66 to relatively high radial pressure loading on the attachment points or interfaces between the rails 74R and retention pins 84. Because CMC material can be relatively stiff, the attachment surfaces may not be very compliant and may have relatively small contact areas that communicate the radial pressure loads to the support structure. The disclosed seal arc segments, including the seal arc segments 66, are dimensioned to establish a complete gas path surface and a reduced pressure load arrangement having a reduced backside surface area exposed to the pressurizing cooling flow CF during engine operation.

Figure 5:
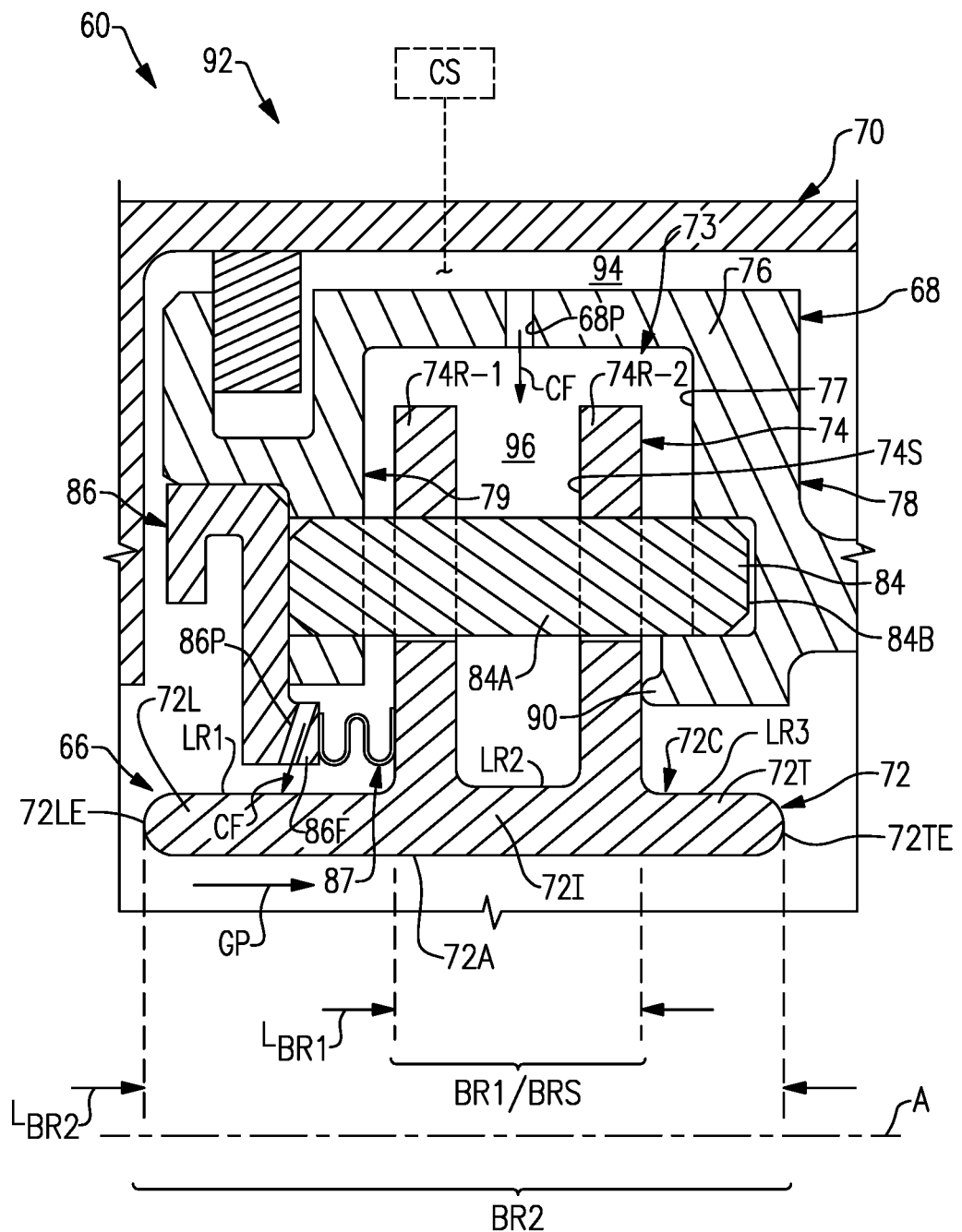
FIG. 5 illustrates the cooling scheme of FIG. 3.
Figure 6:
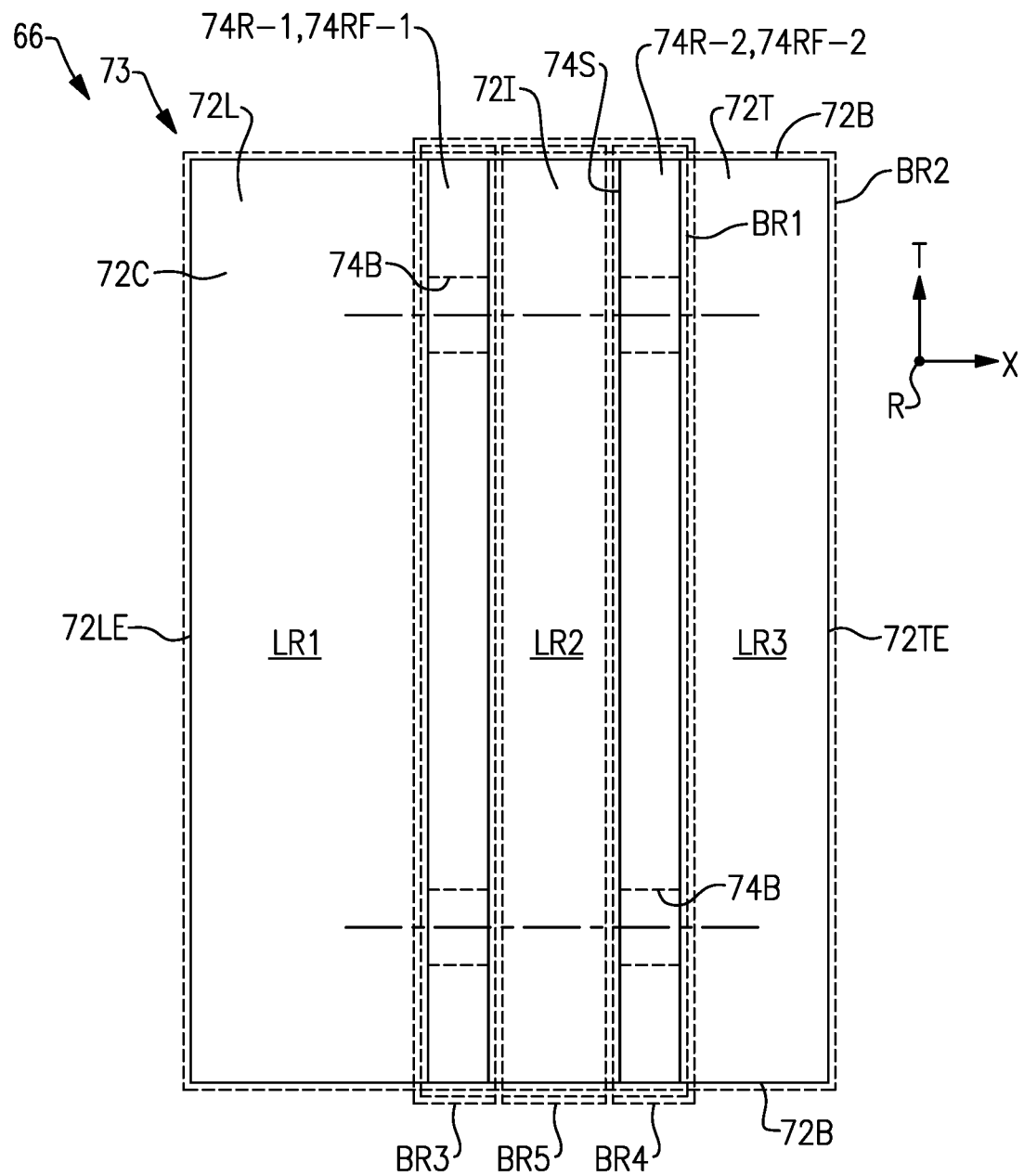
FIG. 6 illustrates a plan view of the seal arc segment of FIG. 5.

Referring to FIGS. 5-6, with continuing reference to FIGS. 3-4, each seal arc segment 66 is dimensioned to establish a first backside region BR1 and a second backside region BR2 along the backside 73 of the seal arc segment 66 radially opposed to the sealing face 72A (shown in dashed lines in FIG. 6 for illustrative purposes).

Surfaces of the seal arc segment 66 radially opposed to the sealing face 72A between, and inclusive of, the first and second edge faces 74RF-1, 74RF-2 in the axial direction X and between the mate faces 72B in the circumferential direction T establish the first backside region BR1. The first region BR1 is inclusive of a portion of the backside face 72C, including the second localized region LR2. The first backside region BR1 spans a first length $L_{BR1}$ in the axial direction X (FIG. 5).

Surfaces of the seal arc segment 66 radially opposed to the sealing face 72A between the leading and trailing edges 72LE, 72TE in the axial direction X and between the mate faces 72B in the circumferential direction T establish the second backside region BR2. The second backside region BR2 is established along the leading and trailing edge sections 72L, 72T cantilevered from the intermediate section 72I, with the second region BR2 inclusive of the first backside region BR1 and an entirety of the backside face 72C including the localized regions LR1-LR3. The second backside region BR2 spans a second length $L_{BR2}$ in the axial direction X (FIG. 5). A ratio of the first length $L_{BR1}$ to the second length $L_{BR2}$ is equal to or less than 1.0. In examples, the ratio of the first length $L_{BR1}$ to the second length $L_{BR2}$ is equal to or less than 0.5, or more narrowly equal to or greater than 0.2. In further examples, the ratio of the first length $L_{BR1}$ to the second length $L_{BR2}$ is equal to or less than 0.4. The ratio of the first length $L_{BR1}$ to the second length $L_{BR2}$ can be greater than 0.5. In examples, the ratio of the first length $L_{BR1}$ to the second length $L_{BR2}$ is equal to or greater than 0.6 and is less than or equal to 0.9.

The rails 74R of each seal arc segment 66 are dimensioned to establish third, fourth and fifth backside regions BR3-BR5 along the backside 73 of the seal arc segment 66 (shown in dashed lines in FIG. 6 for illustrative purposes). The third backside region BR3 is established by surfaces of the first rail 74R-1 between the leading edge section 72L and the intermediate section 72I in the axial direction X and between the mate faces 72B in the circumferential direction T, inclusive of the first edge face 74RF-1. The fourth backside region BR4 is established by surfaces of the second rail 74R-2 between the trailing edge section 72T and the intermediate section 72I in the axial direction X and between the mate faces 72B in the circumferential direction T, inclusive of the second edge face 74RF-2. The fifth backside region BR5 is established by surfaces of the backside cavity 74S between the first and second rails 74R-1, 74R-2. In the illustrative example of FIG. 6, the surface area of the first backside region BR1 is equal to the surface area of the third, fourth and fifth backside regions BR3-BR5.

Surfaces of the seal arc segment 66 can be subject to various pressure loads along the regions BR1-BR5 during engine operation. The regions BR1-BR5 can be dimensioned to reduce radial loading caused by pressurized fluid communicated in the gas path GP and/or cooling cavity 96 and associated pressure differentials established across the seal arc segment 66.

Surfaces of the seal arc segment 66 can be dimensioned to reduce loading along the backside 73 and on the attachment points established by the interface portion 74. A radially facing component of a total surface area of the first backside region BR1 divided by a radially facing component of a total surface area of the second backside region BR2 relative to the radial direction R establishes a first load ratio (BR1:BR2). The first load ratio can be equal to or less than 1.0. In examples, the first load ratio is equal to or less than 0.5. In further examples, the first load ratio is equal to or greater than 0.2, or more narrowly is equal to or less than 0.4, such as approximately 0.33. The first load ratio can be greater than 0.5. In examples, the first load ratio is equal to or greater than 0.6 and is less than or equal to 0.9. One would understand how to determine total surface area and the components thereof in view of the teachings disclosed herein.

The backside 73 of the seal arc segment 66 can be dimensioned to reduce radial loading that may occur due to exposure of pressurized cooling flow CF in the cooling cavity 96. A backside surface region BRS of the seal arc segment 66 is established along surfaces of the seal arc segment 66 exposed to the cooling cavity 96. As illustrated in FIG. 5, the first backside region BR1 and the backside surface region BRS are the same. In other examples, the first backside region BR1 differs from the backside surface region BRS (see, e.g., FIG. 7). In the illustrative example of FIG. 5, the seal arc segment 66 is arranged such that substantially all radially facing surfaces of the seal arc segment 66 exposed to the cooling cavity 96 extend along the first backside region BR1, and the radially facing component of a total surface area of the seal arc segment 66 along the backside surface region BRS divided by the radially facing component of a total surface area of the second backside region BR2 establishes a surface load ratio (BRS:BR2). The surface load ratio can be approximately equal to the first load ratio, including any of the values disclosed herein. For the purposes of this disclosure, the term "approximately" means±3 percent of the stated value unless otherwise disclosed.

Each feeding passage 68P is arranged to convey a portion of the cooling flow CF to the backside cavity 74S to cool adjacent portions of the seal arc segment 66. The seal arc segment 66 is arranged such that surfaces of the first and third localized regions LR1, LR3 of the backside face 72C are exposed to gases in the gas path GP, with the leading and trailing edge sections 72L, 72T arranged to form a complete gas path surface along the gas path GP. Radially pressure loads on the surfaces of the first and third localized regions LR1, LR3 can be relatively less than radial pressure loads on surfaces of the seal arc segment 66 along the first backside region BR1 including the second localized region LR2 due to a pressure differential between the coolant source CS and the cavities adjacent to the localized regions LR1, LR3 and/or the adjacent gas path GP. The coolant source CS is operable to convey pressurized cooling flow CF to the cooling cavity 96 in operation at a fluid pressure that is greater than a fluid pressure in the cavities adjacent to the localized regions LR1, LR3, and the gas path GP such that a fluid pressure in the cooling cavity 96 along the first backside region BR1 is greater than a fluid pressure across the leading edge section 72L and/or is greater than a fluid pressure across the trailing edge section 72T.

The rails 74R can be formed at different relative axial positions to vary (e.g., reduce) the surface area of the backside cavity 74S along the intermediate section 72I. A radially facing component of a total surface area of the fifth backside region BR5 established by the backside cavity 74S divided by the radially facing component of the total surface area of the second backside region BR2 establishes a second load ratio (BR5:BR2). In examples, the second load ratio is equal to or less than 0.2.

A radially facing component of a total surface area of the third and fourth backside regions BR3, BR4 established by the first and second edge faces 74RF-1, 74RF-2 divided by the radially facing component of the total surface area of the first backside region BR1 establishes a third load ratio (BR3-4:BR1). In examples, the third load ratio is equal to or less than 0.5. The rails 74R can be dimension such that the radially facing component of the total surface area of the third backside region BR3 is substantially equal to the radially facing component of the total surface area of the fourth backside region BR4. A radially facing component of the total surface area of the first and second edge faces 74RF-1, 74RF-2 divided by the radially facing component of the total surface area of the backside cavity 74S establishes a fourth load ratio (BR3-4:BR5). In examples, the fourth load ratio is equal to or less than 1.0, or more narrowly between 0.7 and 0.9.

The assembly 60 can be assembled as follows. Referring to FIG. 3, the interface portion 74 of each seal arc segment 66 is positioned relative to the first and second interface portions 78, 79 of the support 68. At least one retention pin 84 is moved in a direction D2 and is inserted in the interface bore(s) 74B and support bores 78B, 79B such that engagement of the retention pin 84 with surfaces of the interface bore(s) 74B and the support bores 78B, 79B establishes the installed position in which the seal arc segment 66 is carried by the retention pins 84. Thereafter, the support plate 86 is secured to the support 68 such that the retention pins 84 are trapped between the support 68 and support plate 86. The assembly 60 is arranged such that the support 68 and the backside face 72C of the seal arc segment 66 bound the perimeter of the cooling cavity 96 along the first backside region BR1, and the support plate 86 is dimensioned to bound the perimeter of the cooling cavity 96 as illustrated in FIGS. 3 and 5. The seal arc segments 66 are arranged such that the first and third localized regions LR1, LR3 of the backside face 72C are outward (e.g., radially inward relative to the radial direction R) of the perimeter of the cooling cavity 96. The first and third localized regions LR1, LR3 can be exposed to a pressure that is less than a pressure in the cooling cavity 96, which could be the same or could differ from the pressure in the gas path GP.

During operation, pressurized cooling flow CF is conveyed from each feeding passage 68P to the cooling cavity 96. A first fluid pressure is established in the cooling cavity 96, and a second fluid pressure is established between the support plate 86 and the respective leading and trailing edge sections 72L, 72T which may be higher or substantially the same as an adjacent region of the gas path GP. The first and second fluid pressures can be the same or can differ to establish a pressure differential between the feeding plenum 94 and cooling cavity 96 (and adjacent gas path GP). The pressurized cooling flow CF is conveyed to the cooling cavity 96 in operation such that a fluid pressure across the second localized region LR2 of the backside face 72C is greater than a fluid pressure across the first localized region LR1 and/or is greater than a fluid pressure across the third localized region LR3 of the backside face 72C. In the illustrative example of FIG. 5, a portion of the cooling flow CF in the cooling cavity 96 is conveyed through each cooling passage 86P in a direction towards the leading edge section 72L of the seal arc segment 66.

Figure 7:
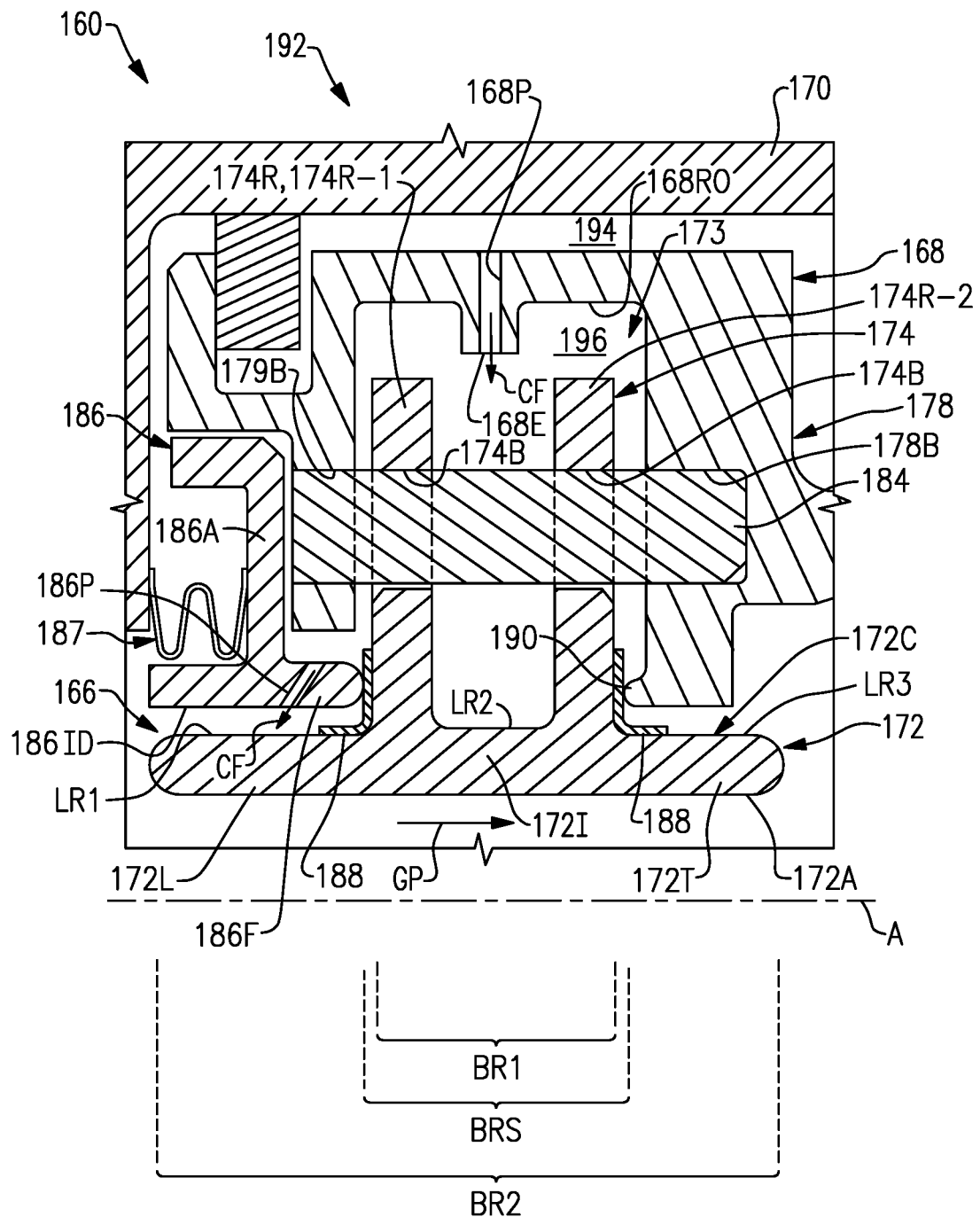
FIG. 7 illustrates a section view of a seal assembly according to an example.

FIG. 7 illustrates an assembly 160 for a gas turbine engine according to another example. In this disclosure, like reference numerals designate like elements where appropriate and reference numerals with the addition of one-hundred or multiples thereof designate modified elements that are understood to incorporate the same features and benefits of the corresponding original elements. The assembly 160 includes at least one seal arc segment 166, at least one support 168 and a support plate 186.

The assembly 160 establishes a cooling scheme 192 including a feeding plenum (or cavity) 194 and cooling cavity 196. A seal member 187 is captured between the engine case 170 and support plate 186 to bound a perimeter of a feeding plenum 194. The seal member 187 can incorporate various seal configurations. In the illustrative example of FIG. 7, the seal member 187 is a W-seal arranged to oppose flow along an axial gap between the engine case 170 and support plate 186.

The support 168 includes at least one face seal 190 dimensioned to engage the interface portion 174. The face seal 190 is dimensioned to oppose fluid flow along an axial gap between the interface portion 174 and a first interface portion 178 of the support 168. The face seal 190 is dimensioned to bound a perimeter of the cooling cavity 196 adjacent to a third localized region LR3.

The support plate 186 includes a plate flange 186F extending outwardly from a plate body 186A. The plate flange 186F is dimensioned to extend along an inner diameter 186ID of the support plate 186.

The seal arc segment 166 can include one or more sacrificial members 188 disposed on surfaces of rails 174R of interface portion 174 and/or surfaces of a backside face 172C of the seal arc segment 166. The plate flange 186F is arranged to contact an adjacent sacrificial member 188 along a rail 174R-1 to bound the perimeter of the cooling cavity 196 adjacent to a first localized region LR1. In other examples, the sacrificial member(s) 188 are omitted, and the face seal 190 and plate flange 186F directly abut against the respective rails 174R.

The sacrificial members 188 can be made of a material that differs from a material of the face seal 190 and/or plate flange 186F. The sacrificial members 188 can be machined or otherwise formed to have a complementary geometry with the respective rail 174R while preserving a construction of the underlying laminate structure of the seal arc segment 166. The sacrificial member 188 can be a coating, sheet metal formed to a complementary geometry, or constructed from one or more sacrificial plies or layers, for example, and is dimensioned to eliminate or otherwise reduce direct contact between surfaces of the face seal 190 and plate flange 186F and the respective rails 174R-1, 174R-2. An example coating includes a silicon metal that is adapted to substantially match a rate of thermal expansion of the seal arc segment 166 to reduce a likelihood of spalling of the laminate structure of the CMC layup. Utilizing coatings to form the sacrificial member 188 can eliminate or otherwise reduce a leak path control dimensional variation and can provide low surface roughness to improve sealing along the interface.

Each seal arc segment 166 is dimensioned to establish a first backside region BR1 and a second backside region BR2 along a backside 173 of the seal arc segment 166 radially opposed to the sealing face 172A. The sacrificial members 188 are arranged such that a backside surface region BRS is established along surfaces of the seal arc segment 166 and sacrificial members 188 exposed to the cooling cavity 196. The seal arc segment 166 is arranged such that a perimeter of the backside surface region BRS surrounds and extends outwardly of the first backside region BR1.

The cooling scheme 192 includes one or more feeding and cooling passages 168P, 186P arranged to convey cooling flow CF towards adjacent portions of the seal arc segments 166. The feeding and cooling passages 168P, 186P can be arranged at various radial distances or heights relative to the backside face 172C of the seal arc segment 166. For example, the support 168 can be dimensioned such that an exit port 168E of the feeding passage 168P is defined radially inwardly of a radially outward surface 168RO of the support 168 bounding the cooling cavity 196, as illustrated in FIG. 7.

Figure 8:
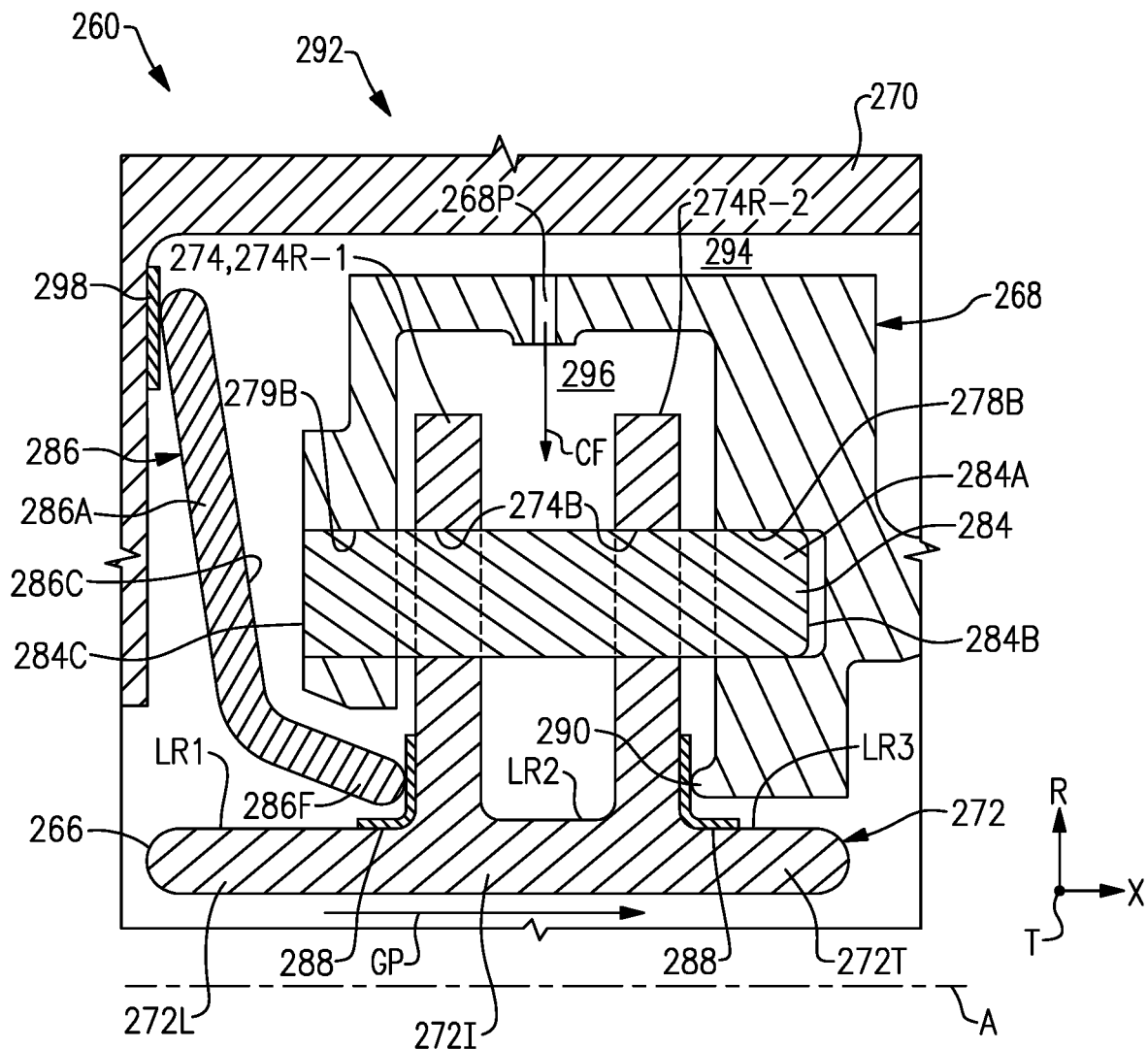
FIG. 8 illustrates a section view of a seal assembly according to another example.

FIG. 8 illustrates an assembly 260 for a gas turbine engine according to another example. The assembly 260 includes at least one seal arc segment 266, support 268 and support plate 286. The assembly 260 establishes a cooling scheme 292 including a feeding plenum 294 and cooling cavity 296.

The support plate 286 may generally be referred to as a "dog bone seal" and includes a plate body 286A and a plate flange 286F extending transversely from the plate body 286A. The plate body 286A is arranged to abut an engine case 270 directly or along a sacrificial member 298 which can be constructed according to any of the techniques disclosed herein. The support plate 286 is arranged such that a major component of the plate body 286A and a minor component of the plate flange 286F extend in a radial direction R and such that a minor component of the plate body 286A and a major component of the plate flange 286F extend in an axial direction X relative to the longitudinal axis A.

The support plate 286 includes a stop member 286C extending outwardly from the plate body 286A. The stop member 286C is radially aligned with a second end portion 284C of retention pin 284 to limit axial movement of the retention pin 284 relative to the longitudinal axis A.

Figure 9:
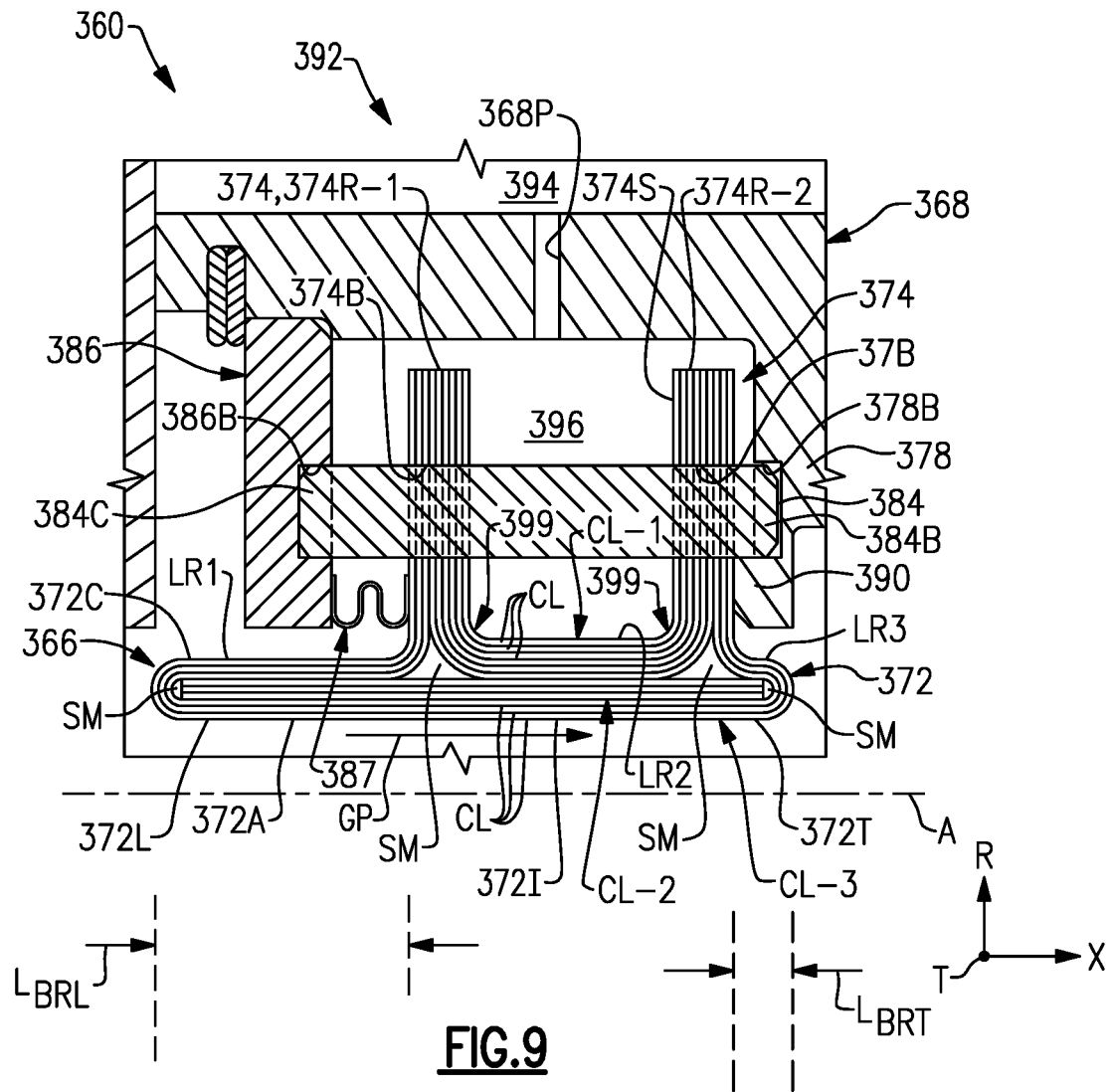
FIG. 9 illustrates a section view of a seal assembly according to yet another example.

FIG. 9 illustrates an assembly 360 for a gas turbine engine according to another example. The assembly 360 includes at least one seal arc segment 366, at least one support 368 and support plate 386. The seal arc segment 366 can be dimensioned to such that a leading edge section 372L spans a length $L_{BRL}$ and such that a trailing edge section 372T spans a length $L_{BRT}$ in an axial direction X. The lengths $L_{BRL}$, $L_{BRT}$ can be the same or can differ as illustrated in FIG. 9.

The seal arc segment 366 can be made of high temperature materials including any of the materials disclosed herein. In the illustrative example of FIG. 9, the seal arc segment 366 is made of a CMC material including a plurality of layers CL in stacked relationship to establish a laminate structure of a CMC layup. Each layer CL can incorporate various fiber arrangements and materials.

Various constructions can be utilized to establish the CMC layup. In the illustrative example of FIG. 9, each seal arc segment 366 includes first, second and third sets of layers CL (indicated at CL-1 to CL-3) that cooperate to establish a sealing portion 372 and interface portion 374 of the seal arc segment 366. The first set of layers CL-1 establish rails 374R and intermediate portion 3721 along a second localized region LR2. The second set of layers CL-2 establish an internal core of the sealing portion 372. The third set of layers CL-3 extend along the first and second sets of layers CL-1, CL-2 to establish the rails 374R and the faces 372A, 372C of the sealing portion 372. The CMC layup can include one or more fillers or stiffening members SM arranged between the sets of layers CL-1, CL-2 and/or CL-3. The stiffening members SM can include various materials such as chopped fibers in a resin matrix, for example.

The ply layers CL are arranged in stacked relationship to establish a backside cavity 374S between the first and second rails 374R-1, 374R-2 along the second region LR2 of the seal arc segment 366. In the illustrative example of FIG. 9, the first set of layers CL-1 are radiused at interfaces 399 between the sealing portion 372 and the respective rails 374R. Other example geometries at the interfaces 399 can include planar sloping facings interconnecting vertical faces of the rails 374R and the backside face 372C.

The support plate 386 can include one or more plate bores 386B (one shown for illustrative purposes) dimensioned to at least partially receive a second end portion 384C of a respective retention pin 384. In an installed position, each interface bore 374B is partially or completely radially aligned with an adjacent support bore 378B and/or plate bore 386B. Each retention pin 384 is slidably received in, and extends at least partially through, the interface bore 374B of each rail 374R-1, 374R-2. The first end portion 384B of the retention pin 384 is at least partially received or inserted into the respective support bore 378B, and the second end portion 384C of the retention pin 384 is at least partially received or inserted into the respective plate bore 386B to secure the first interface portion 374 of the seal arc segment 366 to the support 368. Various techniques can be utilized to secure the retention pin 384 to the support 368 and/or support plate 386, such as press fitting or threadedly attaching the retention pin 384 in the support bore 378B and/or plate bore 386B.

Figure 10:
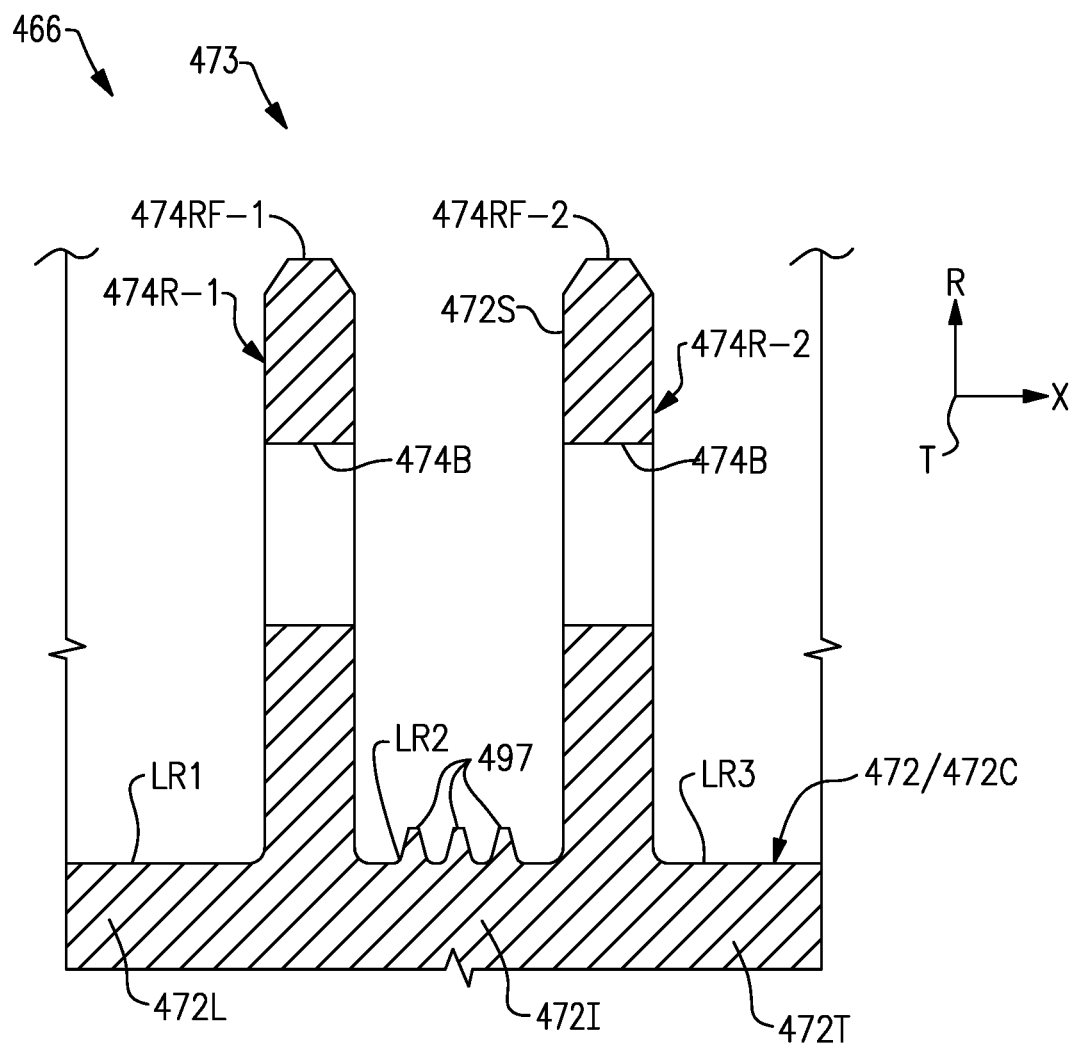
FIG. 10 illustrates a section view of a seal arc segment according to another example.

FIG. 10 illustrates a seal arc segment 466 according to another example. A backside 473 of the seal arc segment 466 can be substantially planar or can be contoured utilizing various techniques. For example, surfaces of first and/or second rails 474R-1, 474R-2 can be chamfered or beveled to slope towards the backside face 472C, as illustrated in FIG. 10. In other examples, the rails 474R can include fillets along the edge faces 474RF-1, 474RF-2. The seal arc segment 466 can include one or more undulations 497 between the rails 474R along a second localized region LR2. The undulations 497 can be established by a set of grooves and ridges along a surface of the backside face 472C, for example.

Figure 11:
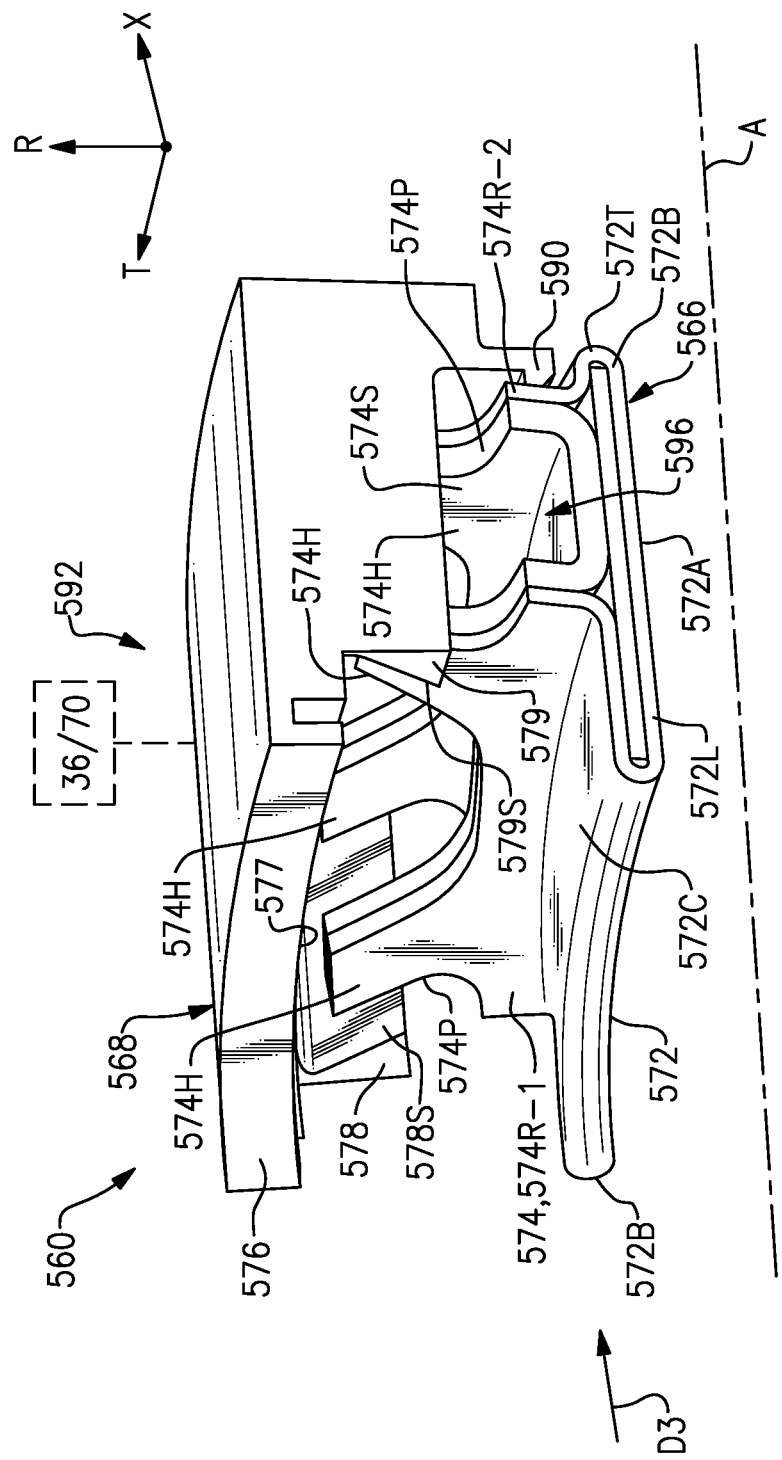
FIG. 11 illustrates a seal assembly including a seal arc segment according to yet another example.

FIG. 11 illustrates an assembly 560 according to another example. The assembly 560 includes a support 568 and at least one seal arc segment 566 mounted to the support 568. The support 568 includes a mounting portion 576, a first interface portion 578 and a second interface portion 579, which can be made of any of the materials disclosed herein. The mounting portion 576 is attachable to the engine static structure 36 directly or through the engine case 70 (shown in dashed lines for illustrative purposes). In the illustrative example of FIG. 11, the interface portions 578, 579 are a pair of opposed flanges that extending radially inwardly from the mounting portion 576 in a direction towards the longitudinal axis A.

The first interface portion 578 includes a first sloped surface 578S, and the second interface portion 579 includes a second sloped surface 579S. The sloped surfaces 578S, 579S are generally opposed to each other and are dimensioned to face in the radial and circumferential directions R, T in an installed position, as illustrated in FIG. 11.

The support 568 includes a support cavity 577 established between the interface portions 578, 579. The sloped surfaces 578S, 579S of the interface portions 578, 579 are dimensioned such that the support cavity 577 has a generally dovetail shaped geometry.

Figure 12:
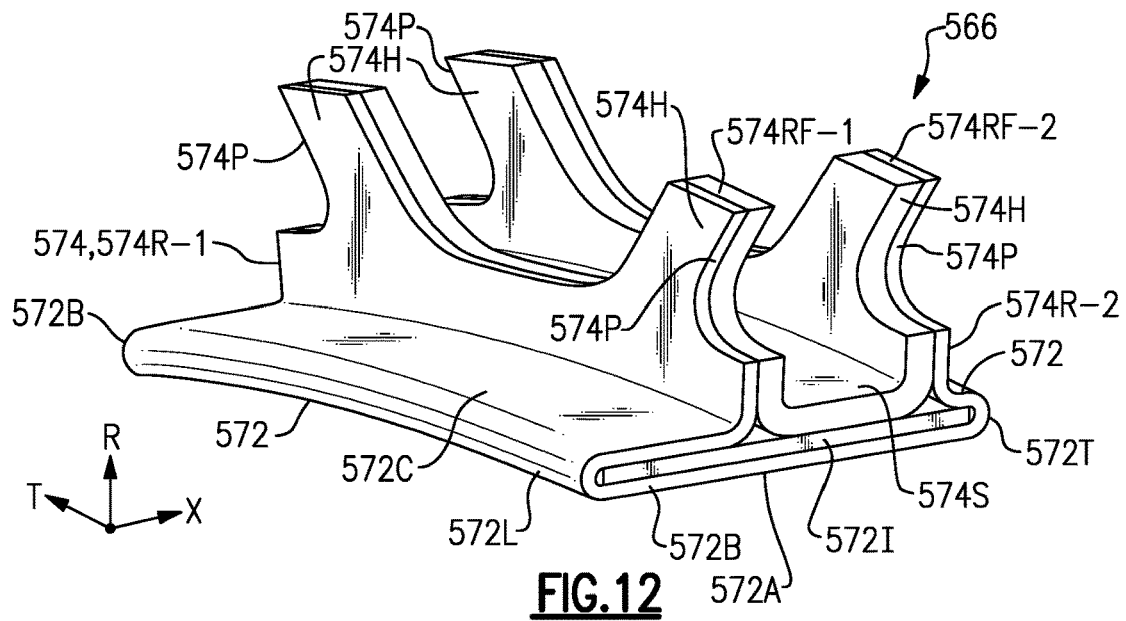
FIG. 12 illustrates a perspective view of the seal arc segment of FIG. 11.
Figure 13:
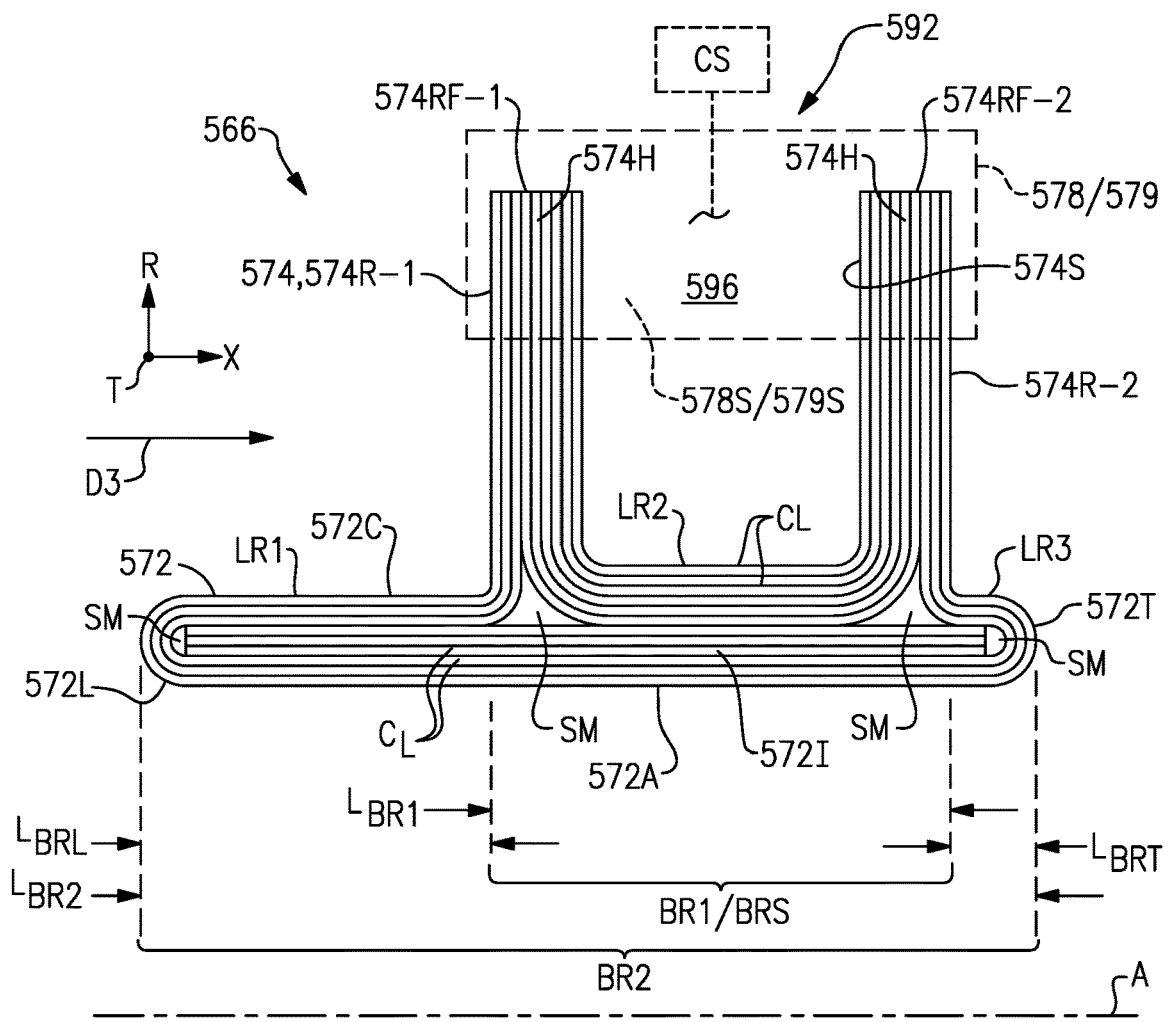
FIG. 13 illustrates a section view of the seal arc segment of FIG. 12.

Referring to FIGS. 11-13, the seal arc segment 566 includes a pair of rails 574R (indicated at 574R-1, 574R-2).

The rails 574R are dimensioned to extend from and between the mate faces 572B. Each of the rails 574R include a respective pair of hooks 574H. The rails 574R extend radially outwardly in a radial direction R from the sealing portion 572 to respective edge faces 574RF (indicated at 574RF-1, 574RF-2). The hooks 574H can be dimensioned such that surfaces of the edge faces 574RF include planar segments at terminal ends of the hooks 574H and contoured segments between the hooks 574H and adjacent to the mate faces 572B, as illustrated in FIG. 12. The contouring establishes respective pockets 574P adjacent the mate faces 572B. Each hook 574H is dimensioned to complement a geometry of the respective sloped surfaces 578S, 579S. A backside cavity 574S is established between the rails 574R along a second region LR2 (FIG. 13) of the seal arc segment 566.

Referring to FIG. 11, with continuing reference to FIGS. 12-13, the support cavity 577 is dimensioned to at least partially receive the rails 574R. Pairs of the pockets 574P adjacent to the respective mate faces 572B are substantially aligned in the axial and circumferential directions X, T and are dimensioned to form a generally concave or dovetail shape for engagement with the interface portions 578, 579. The seal arc segment 566 is moved in a direction D3 such that adjacent pairs of the hooks 574H abut the respective sloped surfaces 578S, 579S of the interface portions 578, 579 to mount the seal arc segment 566 to the support 568 in an installed position. The interface portions 578, 579 are shown in dashed lines in FIG. 13 for illustrative purposes. The direction D3 can have a major component in the axial direction X and can be parallel to the longitudinal axis A.

Referring to FIG. 13, with continuing reference to FIGS. 11-12, the assembly 560 establishes a cooling arrangement or scheme 592. Various cooling schemes 592 may be utilized, including any of the cooling schemes in combination with any of the assemblies disclosed herein. Coolant source CS is configured to supply cooling air or fluid flow CF to a cooling cavity 596. A backside surface region BRS of the seal arc segment 566 is established along surfaces of the seal arc segment 566 exposed to the cooling cavity 596. The support 568 can include at least one face seal 590 dimensioned to engage a respective one of the rails 574R, such as the second rail 574R-2 as illustrated in FIG. 11.

Various materials can be utilized to construct the seal arc segment 566, including any of the materials disclosed herein. In the illustrative example of FIG. 13, the seal arc segment 566 is made of a CMC material including a plurality of layers CL in stacked relationship to establish a laminate structure of a CMC layup. Each layer CL can incorporate various fiber arrangements and materials, including any of the materials and arrangement disclosed herein such as the arrangement of FIG. 9.

The seal assembly 560 including the seal arc segment 566 and cooling scheme 592 can be dimensioned according to any of the relationships disclosed herein, including but not limited to the disclosed load ratios and values, including a first load ratio (BR1:BR2) and a surface load ratio (BRS:BR2). The seal arc segment 566 can be dimensioned to such that a leading edge section 572L spans a length $L_{BRL}$ and such that a trailing edge section 572T spans a length $L_{BRT}$ in the axial direction X. The lengths $L_{BRL}$, $L_{BRT}$ can be the same or can differ as illustrated in FIG. 13.

The disclosed seal arc segments 66/166/266/366/466/566 can be dimensioned and/or arranged utilizing any of the techniques and values disclosed herein. The disclosed arrangements may reduce radial pressure loads on the attachment points of the seal arc segments while establishing a full gas path surface. Reduced pressure loads can lower localized stress concentrations along and/or adjacent to the attachment points and can improve durability of the seal arc segments.

It should be understood that relative positional terms such as "forward," "aft," "upper," "lower," "above," "below," and the like are with reference to the normal operational attitude of the vehicle and should not be considered otherwise limiting.

Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A seal assembly for a gas turbine engine comprising:
a seal arc segment including a sealing portion, a first rail and a second rail opposed to the first rail, the sealing portion extending in a circumferential direction between opposed mate faces and extending in an axial direction between a leading edge and a trailing edge, each of the first and second rails extending outwardly in a radial direction from the sealing portion to respective first and second edge faces, and the sealing portion including a sealing face dimensioned to bound a gas path and including a backside face opposed to the sealing face;
wherein each of the first and second rails includes at least one interface bore dimensioned to receive a retention pin such that the seal arc segment is carried by the retention pin in an installed position; and
wherein the seal arc segment radially opposed to the sealing face between the first and second edge faces establishes a first region, the first region inclusive of a portion of the backside face and the first and second edge faces, the seal arc segment radially opposed to the sealing face between the leading and trailing edges establishes a second region, the first and second regions extending circumferentially between the mate faces, the second region inclusive of the backside face and the first region, and wherein a radially facing component of a total surface area of the first region divided by a radially facing component of a total surface area of the second region establishes a load ratio, and the load ratio is equal to or less than 0.5.

2. The assembly as recited in claim 1, wherein the seal arc segment comprises a ceramic material.

3. The assembly as recited in claim 2, wherein the seal arc segment includes a plurality of ply layers in stacked relationship that establish a backside cavity between the first and second rails along the second region.

4. The assembly as recited in claim 3, wherein the plurality of ply layers are radiused at interfaces between the sealing portion and the respective first and second rails.

5. The assembly as recited in claim 2, wherein a backside cavity is established between the first and second rails, and wherein a radially facing component of a total surface area of the backside cavity divided by the radially facing component of the total surface area of the second region is equal to or less than 0.2.

6. The assembly as recited in claim 5, wherein a radially facing component of a total surface area of the first and second edge faces divided by the radially facing component of the total surface area of the first region is equal to or less than 0.5.

7. The assembly as recited in claim 6, wherein the load ratio is equal to or greater than 0.2, and is equal to or less than 0.4.

8. The assembly as recited in claim 1, further comprising:
a support including a mounting portion and an interface portion, the mounting portion attachable to an engine static structure, and the retention pin is dimensioned to engage the interface portion of the support to mount the seal arc segment; and
a support plate releasably secured to the support such that the retention pin is trapped between the support and the support plate in an installed position.

9. The assembly as recited in claim 8, wherein:
the seal arc segment comprises a ceramic matrix composite material;
the sealing portion includes a first cantilevered section between the first rail and the leading edge, and includes a second cantilevered section between the second rail and the trailing edge, the second region established along the first and second cantilevered sections; and
a cooling cavity is established such that a perimeter of the cooling cavity is bounded by the support, the support plate, and the backside face between the first and second rails.

10. The assembly as recited in claim 9, wherein the cooling cavity is coupled to a fluid source that conveys pressurized cooling flow to the cooling cavity in operation such that a fluid pressure in the cooling cavity along the first region is greater than a fluid pressure across the first cantilevered section and is greater than a fluid pressure across the second cantilevered section.

11. The assembly as recited in claim 1, wherein surfaces of the first and second rails slope towards the backside face.

12. The assembly as recited in claim 1, wherein the backside face includes a plurality of undulations between the first and second rails.

13. A gas turbine engine comprising:
an engine case extending along an engine longitudinal axis;
an array of blades rotatable about the engine longitudinal axis; and
a seal assembly comprising:
an array of blade outer air seals BOAS arranged about the array of blades, each of the BOAS including a sealing portion, a first rail and a second rail opposed to the first rail, the first and second rails extending outwardly from the sealing portion, and the sealing portion including a sealing face dimensioned to bound a core flow path and including a backside face opposed to the sealing face;
at least one support attached to the engine case; and
a plurality of retention pins dimensioned to engage the at least one support and the first and second rails of a respective one of the BOAS such that the BOAS are carried by the retention pins;
wherein a cooling cavity is established in a radial direction between the at least one support and the backside face and in an axial direction between the first and second rails relative to the engine longitudinal axis; and
wherein a radially facing component of a total surface area of the respective BOAS along the cooling cavity divided by a radially facing component of a total surface area of the blade outer air seal opposite the sealing face establishes a load ratio, and the load ratio is equal to or less than 0.5.

14. The gas turbine engine as recited in claim 13, wherein each of the BOAS comprises a ceramic material.

15. The gas turbine engine as recited in claim 13, further comprising a support plate positioned relative to the at least one support such that the support plate limits movement of the plurality of retention pins relative to the engine longitudinal axis.

16. The gas turbine engine as recited in claim 13, wherein:
each of the first and second rails extends outwardly in a radial direction from the sealing portion to respective first and second edge faces;
a backside cavity is established between the first and second rails;
a radially facing component of a total surface area of the first and second edge faces divided by a radially facing component of a total surface area of the backside cavity is equal to or less than 1.0; and
the load ratio is equal to or greater than 0.2, and is equal to or less than 0.4.

17. A method of sealing for a gas turbine engine comprising:
positioning a seal arc segment relative to a support, the support attachable to an engine static structure, wherein the seal arc segment includes opposed first and second rails extending radially outwardly from a sealing portion, and the sealing portion includes a sealing face dimensioned to bound a gas path and includes a backside face radially opposed to the sealing face;
moving at least one retention pin into engagement with the support and with at least one of the first and second rails such that the seal arc segment is carried by the at least one retention pin;
conveying pressurized cooling flow to a cooling cavity, and wherein the support and the backside face of the seal arc segment bound a perimeter of the cooling cavity; and
wherein a radially facing component of a total surface area of the seal arc segment along the cooling cavity divided by a radially facing component of a total surface area of the seal arc segment opposite the sealing face establishes a load ratio, and the load ratio is equal to or less than 0.5.

18. The method as recited in claim 17, wherein the seal arc segment comprises a ceramic material.

19. The method as recited in claim 17, further comprising:
trapping the at least one retention pin between the support and a support plate; and
wherein the support plate is dimensioned to bound the perimeter of the cooling cavity.

20. The method as recited in claim 19, wherein:
the backside face includes a first localized region between the first rail and a leading edge of the sealing portion, a second localized region between the first and second rails bounding the cooling cavity, and a third localized region between the second rail and a trailing edge of the sealing portion;

the first and third localized regions are outward of the perimeter of the cooling cavity such the first and third localized regions are exposed to the gas path; and the conveying step occurs such that a fluid pressure across the second localized region is greater than a fluid pressure across the first localized region and is greater than a fluid pressure across the third localized region.

* * * * *